Jan. 9, 1951            D. W. CHANEY            2,537,031
ACRYLONITRILE COPOLYMERS AND
METHOD OF PRODUCING THEM
Filed Sept. 25, 1948
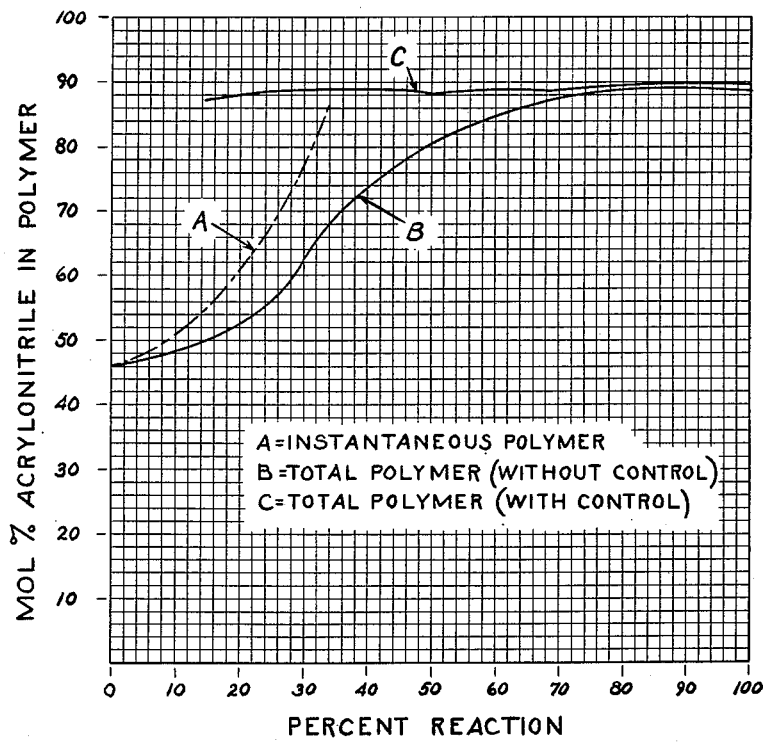
INVENTOR.
DAVID W. CHANEY
BY
Thomas R. O'Malley
ATTORNEY.

Patented Jan. 9, 1951

2,537,031

UNITED STATES PATENT OFFICE 2,537,031

ACRYLONITRILE COPOLYMERS AND METHOD OF PRODUCING THEM

David W. Chaney, Nether Providence Township, Delaware County, Pa., assignor to American Viscose Corporation, Wilmington, Del., a corporation of Delaware Application September 25, 1948, Serial No. 51,188

9 Claims. (Cl. 260—85.5)

This invention relates to the copolymerization of polymerizable organic substances containing the radical CH=C<, and having different rates of acceptance into the copolymer molecule.

As is well known, when the monomeric substances which have different rates of polymerization or of acceptance into the polymer molecule under any given set of copolymerizing conditions are copolymerized by the known polymerization processes, mixtures of high and low polymers having different molecular weights and compositions are obtained. Often the copolymer formed at the later stages of the copolymerization is made up of polymeric chains consisting of only one of the polymerizable substances. This is illustrated by curves A and B of the accompanying graph, which show the results obtained by copolymerizing acrylonitrile and styrene by the conventional solution polymerization process. To obtain the curves, a mixture of 90 mole percent acrylonitrile and 10 mole percent styrene was introduced all at once into water, as is the general practice, a polymerization catalyst was added, the mixture was heated to 70° C., samples of the polymerization product were removed from the reaction at intervals, analyzed for nitrogen, and the values thus obtained were plotted against the percent reaction. As can be seen from the dotted line curve A immediately after inception of the polymerization, the copolymer molecule contained only 45 mole percent acrylonitrile. As the polymerization progressed, the concentration of the monomeric styrene available for acceptance into the polymer molecule fell off rapidly. At 20% reaction the copolymer being formed comprised 68 mole percent acrylonitrile, at 40% reaction all of the styrene was consumed, and thereafter the polymeric chains being formed comprised polyacrylonitrile only. The average or overall molecular weight of the copolymer arrived at by calculation from the molecular weights and compositions of the several copolymers formed might be comparatively low as regards the styrene component, in the range of 90 mole percent acrylonitrile and 10 mole percent styrene, but the copolymer as a whole is not uniform. As shown by the solid line curve B, only about 5% of the total polymer produced actually had a composition in the range of 85 to 95 mole percent acrylonitrile, 15 to 5 mole percent styrene. This non-uniformity of the styrene-acrylonitrile copolymers is typical of the results obtained when it is attempted to copolymerize the vinyl-containing monomers which, under a given set of copolymerizing conditions, have different rates of acceptance into the copolymer molecule by any of the known procedures. Other things being equal, the rate of acceptance of the monomers at any instant during the copolymerization depends primarily on the ratio of the monomers present, and secondarily on other factors which may affect the number of growing chains or their availability for reaction, causing the reaction to go faster or slower. Under the usual conditions of polymerization, the ratio of the monomers available for acceptance into the copolymer molecule changes during the polymerization due to the differences in the rates at which the respective monomers are accepted into the copolymer.

In order to produce copolymers of uniform or practically uniform molecular weight from such monomers, it is necessary to replenish the monomers consumed in the reaction at a rate corresponding to the rate of consumption at any given moment, and to insure the production of copolymers of uniform or practically uniform composition, it is necessary to maintain the amount of each monomer and the ratio of the monomers constant at any given moment throughout the polymerization period. The art does not disclose any reliable method by which these objects may be accomplished.

U. S. 2,420,330 has as an objective the production of copolymers of acrylonitrile and vinyl chloride of uniform composition and completely soluble in acetone, the copolymerization being effected in emulsion. The methods disclosed in the patent depend entirely upon the difference in the rates of polymerization of acrylonitrile and vinyl chloride. These differences are known. The patentees calculate, theoretically, the ratio of acrylonitrile and vinyl chloride which should produce a copolymer of the desired composition, taking into consideration the fact that acrylonitrile is known to have the faster rate of acceptance into the copolymer molecule, and then attempt to maintain the ratio of the acrylonitrile and vinyl chloride constant by adding increments of the mixed monomers, in the theoretically predetermined ratio, to the reaction mass, or by adding acrylonitrile to the mass either in increments at stated intervals or continuously at a fixed rate. These methods do not take into account that the rate of acceptance of the monomers into the copolymer molecule varies with time during polymerization, at any given temperature of polymerization, due to factors additional to the known fact that the individual monomers have different characteristic reactivity coefficients during copolymerization. While the ratio of the monomers required to yield a copolymer of desired composition can be predetermined from available data, it is impossible in practice to predetermine the rate of addition of the monomer or mixture thereof which will maintain the monomer to monomer ratio and the monomer to solvent ratio necessary to produce a uniform copolymer, whether the copolymerization is performed on a batch or continuous scale.

One object of the present invention is to provide a simple, readily reproducible method for copolymerizing the polymerizable organic vinyl-containing substances to produce copolymers having predetermined molecular weights and compositions which do not vary excessively from the beginning to the end of the copolymerization. Another object is to provide copolymers of the vinyl-containing monomers comprising polymeric chains the molecular weight and composition of which are uniform or almost uniform. A further object is to provide a method of copolymerizing monomers of the type aforesaid wherein the monomers available for copolymerization are continuously replenished at a rate corresponding to the rate at which they are consumed in the copolymerization reaction. A further object is to provide a method of copolymerizing the monomers which does not involve an induction period and by which the copolymer can be produced in an hour or less. A specific object is to produce homogeneous copolymers containing from 80 to 98 mole percent acrylonitrile in the copolymer molecule, of uniform high molecular weight in the fiber-forming range, and soluble in available solvents, at room temperature, to yield clear homogeneous solutions which are stable.

These and other objects of the invention are accomplished by a new method wherein the monomers are copolymerized in solution (i. e. a single-liquid-phase system, systems comprising two phases being excluded), under reflux, the mixed monomers are added continuously to the copolymerization solution, and the boiling point and rate of boiling are utilized as guides to determine the rate at which the mixed monomers are added at any given moment.

The invention takes advantage of the principle that a single-phase mixture of liquids in a predetermined proportion which are mutually soluble at the boiling point of the mixture has only one boiling point at any given pressure, and any change in the ratio of the liquids effects a change in the boiling point of the mixture. Thus, when liquid monomers in a solvent are removed from the solution as a result of their acceptance into the copolymer molecule, when the solution is being heated at its boiling point, the monomer-solvent ratio is altered. Alteration in the monomer-solvent ratio will automatically alter the boiling point of the remaining monomer-solvent solution. In the case of a solution of acrylonitrile and styrene in water for example, if the acrylonitrile and styrene are removed from the solution and accepted into the copolymer molecule, the ratio of the monomers to water decreases. The boiling point of the solution immediately rises to correspond to the new monomers-solvent ratio. Therefore any, change in the boiling point of the solution indicates a change in the monomer-solvent ratio, and the boiling point can be used as a criterion of the concentration of monomers present in the solvent at any given moment. However, this is not enough in most cases. Any change in the rate of boiling may effect a change in the ratio of the monomers to each other which will indirectly affect the composition of the copolymer being formed. A constant rate of boiling therefore must be maintained in order to insure a constant monomer ratio in the solvent. In order to control the monomer-solvent ratio and the ratio of the monomers in the solvent, to produce copolymers of uniform molecular weight and composition, therefore, I conduct the copolymerization in solution under reflux, and add the mixed monomers to the copolymerization solution at a rate which is continuously correlated with the temperature and rate of reflux to maintain both the temperature and rate of reflux substantially constant from the beginning to the end of the copolymerization.

The method of the invention can be used for the production of copolymers or interpolymers from mixtures of two or more of the liquid organic polymerizable substances having different rates of acceptance into the copolymer molecule and different vapor pressures, so long as that monomer having the greater vapor pressure, herein called the "control monomer," has a vapor pressure and solubility at the reflux temperature for the solution under the given pressure conditions (which may be atmospheric, superatmospheric, or subatmospheric) such that a reliably detectable change in temperature will result when the amount of the monomer vaporized per liter of solution per degree rise in temperature averages from 0.005 to 0.1 mole, so that a close check is possible on temperature variations. For practical purposes, using generally available thermometers on which the finest reading is from one degree to another, the temperature is not permitted to vary over a range greater than 1° C. Specific examples of monomers which may be used as the "control monomer" when the copolymerization is effected in water are acrylonitrile, vinyl acetate, lower alkyl esters of alkyl substituted acrylic acid, specifically methyl methacrylate, and methacrylonitrile.

The monomer copolymerized with the "control monomer" may be more or less soluble in the solvent used, such as water, than the control monomer and has a vapor pressure lower than the vapor pressure of the "control monomer."

Specific examples of monomer systems which may be copolymerized by the method of the invention, using water as a solvent are: mixtures of acrylonitrile and the acrylates or methacrylates, such as methyl acrylate or methyl methacrylate; mixtures of acrylonitrile and styrene; mixtures of acrylonitrile and vinyl acetate; mixtures of acrylonitrile and vinyl pyridines; mixtures of acrylonitrile and acrylamide or substituted acrylamides; mixtures of acrylonitrile and N-vinyl carbazole. In all of these mixtures, acrylonitrile is the "control monomer." However as indicated above, the invention is not limited to the use of acrylonitrile as the "control monomer," and the method of the invention may be used to produce copolymers from mixtures of the monomers which do not contain acrylonitrile at all, provided that at least one of the monomers meets the requirements for the "control monomer" outlined above. As examples of mixtures of monomers which can be copolymerized, using a monomer other than acrylonitrile as the control monomer, may be mentioned mixtures of vinyl acetate and 2-vinyl pyridine, vinyl acetate being the "control monomer," mixtures of methyl methacrylate and styrene, in which the methyl methacrylate is the "control," and mixtures of methyl acrylate and acrylamide, wherein the methyl acrylate is the "control monomer."

The ratio of the monomers in the starting mixture required to produce a copolymer of given composition can be calculated in advance or determined by direct experiment. The ratio of the monomers may be varied, depending upon the relative rates of acceptance of the respective monomers into the copolymer molecule. However, certain monomer ratios may be excluded for practical reasons.

In carrying out the preferred embodiment of the invention, the desired amount of water is placed in a reflux apparatus. The monomers are then added to the water in a predetermined ratio calculated to yield initially a copolymer of the desired composition, and in an amount sufficient to initiate refluxing at the selected temperature under the given pressure conditions, heat being applied from an external source. As soon as refluxing has commenced, a solution of an appropriate catalyst is added. The concentration of monomers decreases as they are accepted into the polymer molecule and the ratio between the monomers may undergo change. When this occurs, the temperature of reflux tends to rise. In order to prevent this, addition of a mixture of the monomers in a ratio equivalent to that of the first polymer formed (or that accepted by the polymer) is begun and continued at a rate such that the temperature and rate of reflux remain unchanged or practically unchanged until the solids content of the vessel is such that further copolymerization is impractical, at which time the polymerization is terminated quickly.

It is not possible to state for every mixed monomer system the rate at which the mixed monomers must be added at any given moment, to maintain the ratio of the monomers to the solvent constant under the selected polymerizing conditions. The rule is that if the input or removal of heat is such as to normally maintain such a solution having a given concentration at the selected temperature, any detectable increase or decrease in the temperature of the liquid is immediately compensated for by increasing or decreasing the rate at which the mixed monomers are added until the system is again at equilibrium. The rate at which the monomers must be added may increase or decrease at different stages of the reaction, depending upon the tendency of the temperature of reflux and the rate of reflux to increase or decrease.

When all of the monomer mixture has been added, the reaction is terminated by adding an inhibitor to "kill" the catalyst, by filtering off the reaction product and rapidly washing it, or by pouring the reaction mixture into a large volume of cold water. However, the reaction is terminated, the catalyst must be "killed" or removed quickly not only to prevent variations in molecular weight and composition, but also to eliminate the possibility of cross-linking reactions which tend to take place when active catalyst (free radicals) and polymer molecules are present and monomer concentration is very low.

The molecular weight of the copolymers obtained depends upon the concentration of catalyst present and the actual temperature employed. Increasing or decreasing the catalyst concentration, or increasing or decreasing the temperature decreases or increases the molecular weight of the copolymer. This interdependence of the catalyst concentration and polymerization temperature in controlling the actual molecular weight of the copolymer is, of course, known as a general proposition. The present invention provides copolymers which are of uniform or nearly uniform molecular weight and composition throughout regardless of what the overall molecular weight may be in any given case. By variation of the catalyst concentration and the temperature, any average degree of polymerization, such as from 100 to 10,000 can be obtained depending on the copolymer. Preferably the catalyst is present in a concentration of from about 0.05 to 10.0 gms./liter of water, and in any case, the catalyst must be present in a concentration such that the generation of free radicals or initiators does not fall off appreciably during the reaction. Catalysts which may be used are of the water-soluble type, such catalysts being exemplified in persalts of the type of potassium persulfate, ammonium persulfate, and sodium perborate. So called activators of the type of sodium bisulfate may be added to the solvent at the start of operations.

When the copolymerization is conducted under the conditions described, the instantaneous molecular weights and composition vary within a comparatively narrow range, as indicated by the specific viscosities of samples removed at intervals during the reaction. Uniform copolymers having molecular weights in the fiber forming range may be obtained, the copolymers comprising chains which are of medium length, and the chain length being substantially constant at all portions of the product. These copolymers of uniform molecular weight and composition throughout generally dissolve in available solvents to yield clear homogeneous solutions which have less tendency to form gels on standing then do the mixtures of polymers obtained by conventional processes, and such solutions of the uniform copolymers do not contain suspended and undissolved particles as shown by microscopic examination.

The method of this invention is well adapted to copolymerization of the organic polymerizable substances containing the vinyl group on a continuous scale. The copolymer may be withdrawn from the apparatus at the same rate as it is formed, the addition of monomer mixture being maintained continuous and correlated with the temperature and rate of reflux. Any water or catalyst removed with the copolymer may be compensated for by the addition of corresponding amounts of water and catalyst to the reaction vessel.

An outstanding advantage of the invention is that copolymers may be obtained having a controlled composition which is uniform, that is, the relative distribution of the units derived from the respective monomers is more uniform than has been possible heretofore. This permits the production of acrylonitrile polymers in which the polyacrylonitrile chains are spread apart to an extent greater than is the case when the copolymers are made by the known methods. As a result of the more pronounced spreading of the chains, the more percent of the substance other than acrylonitrile required to effect modification of the properties of the homopolymer, such as modification of the extensibility, flexibility, and dyeing capacities of yarns made from the copolymers, is less than is ordinarily required, and generally from 2 to 12 mole per cent.

The more uniform distribution of the modifying component, or different arrangement of the molecules, in the copolymers of uniform molecular weight and homogeneous composition affects the properties of the copolymer which depend primarily on the arrangement of the molecules, such as crystallinity and chain packing. Therefore, various fiber properties which depend on crystallinity, such as tensile strength, extensibility, flexibility, shrinkage on heating, etc., are also affected. Uniform distribution of small amounts, i. e. 2 to 12 mole per cent of the modifying monomer, for example vinyl acetate, or styrene, in the copolymer affects the extensibility; of yarns comprising acrylonitrile copolymers containing such comparatively small amounts of modifying monomer yarns made from copolymers produced by the present process, have, after heat-stabilization, increased extensibility and improved flexibility and knitting properties.

The more uniform character of the copolymers produced in accordance with the method of the invention, in contrast to that of copolymers produced by conventional polymerizing procedures will be apparent from a consideration of the following examples in which proportions and percentages are by weight unless otherwise specified.

EXAMPLE I (A) 18.7 parts of vinyl acetate and 82.2 parts of acrylonitrile were dissolved in 2850 parts of water and heated to 80° C. in a three-neck vessel fitted with thermometer, stirrer, reflux condenser, and dropping funnel. 12 parts of potassium persulfate dissolved in 150 parts of water were heated to 80° C. and added to the mixture. Reaction set in immediately, and the reflux temperature began to rise slowly. As soon as this occurred, continuous addition of a mixture consisting of 38.6 parts of vinyl acetate and 260.5 parts of acrylonitrile was started, the rate of the addition being such that the reflux temperature was maintained at 80° C. (atmospheric pressure) and the rate of reflux remained constant. The rate of the addition is shown in Table I below. As shown, when the reaction was 5% complete, the rate at which the monomer mixture was being added was 2.5 parts/minute. At 10% reaction the rate of addition had to be increased to 4.0 parts of the monomer mixture/minute in order to maintain the temperature at 80° C. and the rate of reflux constant. As the reaction proceeded, the rate of addition had to be increased progressively. The reaction was terminated, when all of the monomeric mixture had been added, by rapidly filtering and washing the filtrate with water. The reaction was complete in 63 minutes and the residual unreacted monomers could be recovered by the usual methods.

Samples were withdrawn at intervals, washed and dried. Each sample was analyzed for nitrogen and its specific viscosity was determined, with the results shown in Table I below.

Table I

| Rate of Addition of the Mixed Monomers, parts/min. | Per Cent Reaction | N Content | CH₂CHCN (mole Per Cent) | Specific Viscosity |
|---|---|---|---|---|
| 2.5 | 5 | 23.2 | 92.2 | .153 |
| 4.0 | 10 | 23.6 | 93.2 | .175 |
| 4.1 | 25 | 23.5 | 93.1 | .244 |
| 4.4 | 40 | 23.6 | 93.5 | .252 |
| 5.2 | 65 | 23.4 | 92.7 | .350 |
| 5.4 | 90 | 23.4 | 92.7 | .330 |
| 6.6 | 100 | | | .362 |

(B) The same quantity of acrylonitrile-vinyl acetate mixture was copolymerized, using the same amounts of water and catalyst, but the monomer mixture was added all at once to the water, and the polymerization was conducted at 70° C. The temperature could not be increased to 80° C. because the maximum solubility of acrylonitrile was exceeded. Under these conditions the system will reflux at 70° only.

Samples were withdrawn at intervals from the reaction batch, were washed, dried and analyzed for nitrogen. The specific viscosities of the samples are shown in Table II below:

Table II

| Per Cent Reaction | N Content | CH₂CHCN (mole Percent) | Specific Viscosity |
|---|---|---|---|
| 25 | 20.0 | 83.7 | .251 |
| 40 | 20.8 | 85.7 | .295 |
| 69 | 20.1 | 83.7 | .655 |
| 90 | 22.3 | 90.0 | .941 |
| 100 | 23.8 | 93.7 | 1.168 |

As is obvious from the tables, the overall or average composition of the copolymers produced by both methods A and B was about 90% acrylonitrile and 10% vinyl acetate. However, the copolymer of method A comprised polymeric chains each having substantially the same composition, whereas the copolymer of method B comprised polymeric chains of widely different compositions. The samples removed during method A had specific viscosities (molecular weight) which varied within a comparatively narrow range, whereas the specific viscosities of the samples from method B varied over a much wider range.

The following example illustrates the production of a copolymer of acrylonitrile and styrene by the method of the invention and by the conventional solution polymerization method.

EXAMPLE II (A) 0.93 part of styrene and 85.7 parts of acrylonitrile were dissolved in 3400 parts of water and heated to 85° C. in a three-neck vessel fitted with thermometer, stirrer, reflux condenser, and dropping funnel. 10.5 parts of potassium persulfate were dissolved in 100 parts of water and added to the contents of the vessel. Polymerization set in immediately, and the reflux temperature began to rise. The continuous addition of a mixture consisting of 75 parts of styrene and 345 parts of acrylonitrile was started immediately to prevent increase in the reflux temperature, the mixture being added at a rate sufficient to maintain the reflux temperature at 85° C. (atmospheric pressure), and the rate of reflux constant.

The reaction was terminated when all of the monomer mixture had been added as described in method A, Example I, above. Time: 48 min.

Table I

| Rate of Addition of the Mixed Monomers, parts/min. | Per Cent Reaction | N Content | CH₂CHCN (mole Per Cent) | Specific Viscosity |
|---|---|---|---|---|
| 8.3 | 15 | 20.6 | 87.3 | ---- |
| 8.6 | 28 | 21.1 | 88.5 | .357 |
| 8.8 | 53 | 20.9 | 88.0 | .339 |
| 8.5 | 69 | 21.0 | 88.3 | .364 |
| 9.4 | 100 | 21.4 | 89.2 | .394 |

Curve C, shown in solid line in the graph represents the copolymer obtained from styrene and acrylonitrile by the above method A.

(B) The same total quantity of acrylonitrile-styrene mixture as in method A was copolymerized, using the same amount of water and catalyst, all of the monomer mixture was added to the water containing the catalyst at one time, and the copolymerization was carried out at 70° C.

Analysis of the samples withdrawn from the reaction batch at intervals had specific viscosities as shown in Table II below:

Table II

| Per Cent Reaction | N Content | $CH_2CHCN$ (mole Percent) | Specific Viscosity |
|---|---|---|---|
| 20 | 8.9 | 50 | .203 |
| 30 | 10.9 | 58 | .303 |
| 50 | 17.7 | 80 | .336 |
| 70 | 20.5 | 87 | .467 |
| 90 | 21.3 | 89 | |

EXAMPLE III

The copolymer of acrylonitrile and styrene produced by method A, Example II, was dissolved in dimethyl formamide at room temperature. A clear homogeneous solution was obtained which did not contain gels or suspended particles, as evidenced by microscopic examination. The solution was spun into a setting bath consisting of isopropanol and given an immersion of 27''. The fibers were stretched 278%. They were washed, dried and subjected to restretch of 300% at a temperature of 170° C., by passing them through a tube 30'' long containing heated air (rate of feed—60' per minute). The resulting fibers had a tensile strength of 4.2 gms. per denier and extensibility of 10.5%. Fibers obtained from a copolymer of the same average composition but prepared by the conventional method (method B of Example II) had a tensile strength similar to that of the fibers from the new copolymer, but had an extensibility of only 6.5%. X-ray examinations show that when styrene is uniformly distributed throughout the copolymer, as in the copolymer prepared by method A of Example II, it breaks up the crystallinity of polyacrylonitrile much more efficiently than when the copolymer is produced by method B of Example II. By this is meant that the polyacrylonitrile polymeric chains in the new copolymer are spread more widely apart. This pronounced spreading of the acrylonitrile chains due to uniform distribution of the styrene or the like throughout the copolymer accounts for the fact that modification of the properties of polyacrylonitrile can be accomplished by the presence of a smaller proportion of the modifying component in the copolymer molecule than has heretofore been considered necessary.

EXAMPLE IV 950 parts of distilled water were placed in a reflux apparatus, and heated to 85° C. 57.9 parts of a monomer mixture consisting of 50.4 parts of acrylonitrile and 7.5 parts of acrylamide were added to the water, whereupon the temperature dropped to 80° C., refluxing continuing. 3.0 parts of recrystallized potassium persulfate were mixed with 50 parts of distilled water, heated on the steam bath and added to the polymerization mixture. With initiation of polymerization, the temperature was permitted to rise to 85° C., where it was maintained by the addition of a mixture consisting of 69 parts of acrylonitrile and 23.1 parts of acrylamide. Samples were withdrawn, as the reaction proceeded. The samples were poured immediately into distilled water containing hydroquinone, filtered under suction, washed three times with boiling water, refiltered and dried in a circulating air oven at 55° C. for about 12 hours.

When all of the monomer mixture (921 parts) had been added, the polymerization mixture was filtered under vacuum, washed several times with distilled water and dried in circulating air at 55° C. for about 12 hours. 70 parts of dry copolymer were obtained.

Analysis of the samples withdrawn from the reaction batch at intervals had specific viscosities as shown in the table below:

| Rate of Addition of the Mixed Monomers, parts/min. | Per Cent Reaction | N Content | $CH_2CHCN$ (mole Per Cent) | Specific Viscosity |
|---|---|---|---|---|
| 1.07 | 9 | 24.76 | 80.1 | .454 |
| 4.8 | 25 | 25.04 | 83.8 | .432 |
| 4.8 | 50 | 25.10 | 84.4 | .401 |
| 4.8 | 67 | 25.08 | 84.2 | .413 |
| 4.1 | 84 | 25.02 | 83.6 | .410 |
| 3.6 | 100 | 24.92 | 82.2 | .440 |

EXAMPLE V

A 14% solution of the copolymer of Example IV in dimethylformamide was spun into isopropanol at 25° C. from an 18 hole, 4 mil jet. The solution was pumped at a rate of 2.1 cc./min., and the fibers were given an immersion of 24'' and taken up at the rate of 22.5 ft./min. The fibers were then stretched by 250% and washed.

After the fibers were thoroughly washed, dried and stretched 275 to 350% of their original length in a hot air tube 30'' long at temperatures from 165 to 215° C., the denier was reduced to 20 to 28. The fibers had dry tensile strengths of 4.9 to 5.5 gms./denier, dry extensibilities of 7 to 9% at break.

EXAMPLE VI 0.97 part of N-vinyl carbazole and 20.5 parts of acrylonitrile were dissolved in 550 parts of water, and heated to reflux with stirring. The mixture refluxed at 84.5° C. One part of potassium persulfate in 50 parts of water was then added. Polymerization set in immediately and the reflux temperature tended to rise. By controlling the rate of addition of a mixture of 20 parts of N-vinyl carbazole and 80 parts of acrylonitrile, and the heat input, the reflux temperature was held at 85°±0.3° C.

Samples were withdrawn and analyzed with the results shown in Table I below:

Table I

| Rate of Addition of Mixed Monomers, Parts/min. | Per Cent Reaction | N Content | $CH_2CHCN$ (Weight Per Cent) | Specific Viscosity |
|---|---|---|---|---|
| 1.6 | 12 | 22.81 | 81.0 | .492 |
| 2.0 | 33 | 23.06 | 82.5 | .586 |
| 1.9 | 56 | 22.77 | 80.7 | .646 |
| 2.2 | 78 | 22.40 | 79.0 | .646 |
| 2.7 | 100 | (21.60) | (75.0) | .723 |

The reaction was stopped when the addition was complete, by rapid filtration and washing with water.

Copolymers of acrylonitrile with the other vinyl-containing monomers having rates of copolymerization different from that of acrylonitrile, which copolymers are homogeneous with respect to molecular weight and composition, and containing from 80 to 98 mole per cent of acrylonitrile in the molecule are not obtained by the known polymerization procedures. Examination of curve A in Fig. 1 reveals that of the total polymer obtained from acrylonitrile and styrene by the conventional solution polymerization process, only about 5% has a composition in the range of 85 to 95 mole per cent acrylonitrile, and this yield was not increased by varying the starting monomer ratio. The impracticability of attempting to separate the small percentage of the product containing 80 to 98 mole per cent acrylonitrile, or the even smaller amount of copolymer having the composition 90 to 98 mole per cent acrylonitrile, from the mixture of different copolymers by fractionation, is obvious.

The results obtained when it was attempted to fractionate copolymers of acrylonitrile and N-vinyl carbazole produced by the conventional suspension polymerization procedure is illustrative. A copolymer was made from a mixture consisting of 80 parts acrylonitrile and 20 parts N-vinyl carbazole, by the conventional suspension polymerization procedure, i. e., the mixture totaling 100 parts was introduced all at once into water (600 parts) and the copolymerization was carried out at 70° C. (atoms. pressure) in the presence of 3% benzoyl peroxide. A copolymer having the overall composition 59 wt. per cent acrylonitrile, 41 wt. per cent N-vinyl carbazole was obtained. It was fractionated five times, with the following results:

| Fraction | Solvent Used for Fractionation | Percent Copolymer Dissolved | N-Vinyl Carbazole in Fraction |
| --- | --- | --- | --- |
| 1 | benzene | 16.0 | 100 |
| 2 | 1,4-dioxane | 3.0 | (100) |
| 3 | 20% dimethyl formamide + 80% 1,4-dioxane. | 11.0 | 69.0 |
| 4 | 40% dimethyl formamide + 60% 1,4-dioxane. | 13.1 | 41.0 |
| 5 | 60% dimethyl formamide + 40% 1,4-dioxane. | 56.9 | 16.3 |

As is apparent, the per cent acrylonitrile contained in the fractions varied from 0 to 83.7%.

A copolymer was prepared by suspending 100 parts of a mixture consisting of 80 parts of acrylonitrile, 20 parts of N-vinyl carbazole in water (600 parts) in the presence of 3% potassium persulfate, and copolymerization was effected at 70° C., atmos. pressure. A copolymer of the overall composition 64 wt. per cent acrylonitrile, 36 wt. per cent N-vinyl carbazole was obtained. This was fractionated six times, with results as follows:

| Fraction | Solvent used for Fractionation | Dissolved | N-vinyl Carbazole in Fraction |
| --- | --- | --- | --- |
| 1 | benzene | 0 | |
| 2 | 1,4-dioxane | 11.3 | (100) |
| 3 | 20% dimethyl formamide + 80% 1,4-dioxane. | 21.3 | (48) |
| 4 | 40% dimethyl formamide + 80% 1,4-dioxane. | 24.4 | 27.2 |
| 5 | 60% dimethyl formamide + 40% 1,4-dioxane. | 16.0 | 29.5 |
| 6 | 80% dimethyl formamide + 20% 1,4-dioxane. | 28.5 | 13.7 |

As is obvious, the per cent acrylonitrile contained in the several fractions varied from 0 to 86.3%.

The present invention makes possible the direct production of acrylonitrile copolymers containing any amount of acrylonitrile in the molecule, but is of special advantage in the production of copolymers containing acrylonitrile in the range of 80 to 98 mole per cent, the copolymers being of uniform or practically uniform composition and molecular weight throughout. As small an amount as 2 mole per cent of the modifying component, when uniformly distributed throughout the polyacrylonitrile chains, effects a modification of the properties of the product as compared to the properties of polyacrylonitrile per se.

I claim:

1. The method for the solution copolymerization of mixed, organic polymerizable monomers which contain the group $CH_2=C<$, and have different vapor pressures and rates of acceptance into the copolymer molecule, the monomer of greater vapor pressure having, at the reflux temperature for the solution, a vapor pressure and solubility in water such that a reliably detectable temperature change will result when the amount of the monomer vaporized per liter of solution averages 0.005 to 0.1 mole, which comprises dissolving in water to form a single-liquid-phase system a small amount of a mixture of the monomers containing them in predetermined proportions, bringing the solution to reflux temperature, adding a water-soluble polymerization catalyst to the solution at the reflux temperature and, after copolymerization has been initiated, continuously adding to the solution a mixture comprising the monomers in proportions corresponding to the proportions of the monomers in the copolymer formed initially, at a rate which maintains the rate and temperature of reflux substantially constant throughout the copolymerization reaction, said copolymerization being carried out exclusively in a single-liquid-phase system.

2. The method for the solution copolymerization of acrylonitrile with at least one other organic polymerizable monomer which contains the group $CH_2=C<$, which comprises dissolving in water to form a single-liquid-phase system a small amount of an acrylonitrile-containing mixture of the monomers containing them in predetermined proportions, bringing the solution to reflux temperature, dissolving a polymerization catalyst in the solution at the reflux temperature and, after copolymerization has been initiated, continuously adding to the solution a mixture comprising the monomers in proportions corresponding to the proportions of the monomers in the copolymer formed initially, at a rate which maintains the rate and temperature of reflux substantially constant throughout the copolymerization reaction, said copolymerization being carried out exclusively in a single-liquid-phase system.

3. A method as in claim 2, wherein the polymerizable substances are acrylonitrile and vinyl acetate.

4. A method as in claim 2, wherein the polymerizable substances are acrylonitrile and styrene.

5. A method as in claim 2, wherein the polymerizable monomers are acrylonitrile and acrylamide.

6. A method as in claim 2, wherein the polymerizable monomers are acrylonitrile and N-vinyl carbazole.

7. A method as in claim 2, wherein the polymerizable monomers are acrylonitrile and a vinyl-pyridine.

8. A method as in claim 2, wherein the water-soluble polymerization catalyst is heated to the temperature of reflux before it is added to the aqueous solution.

9. A process as defined in claim 2 comprising the step of continuously withdrawing the copolymer at the rate at which it is formed in the reaction.

DAVID W. CHANEY.

REFERENCES CITED

The following references are of record in the file of this patent:

UNITED STATES PATENTS

| Number | Name | Date |
|---|---|---|
| 2,430,330 | Shriver et al. | May 13, 1947 |
| 2,436,926 | Jacobson | Mar. 2, 1948 |